United States Patent [19]

Matsuura

[11] 4,070,233

[45] Jan. 24, 1978

[54] PROCESS OF THE PULPING OF BLEACHING OF VEGETABLE MATERIAL

[75] Inventor: Hiroshi Matsuura, Tokyo, Japan

[73] Assignee: Japan Pulp & Paper Research Instutute Inc., Tokyo, Japan

[21] Appl. No.: 262,645

[22] Filed: June 14, 1972

[30] Foreign Application Priority Data

June 14, 1971 Japan .................. 46-42438

[51] Int. Cl.[2] .................. D21C 3/18

[52] U.S. Cl. .................. 162/28; 162/32; 162/66; 162/67; 162/82; 162/85; 162/86; 162/89; 162/90

[58] Field of Search .................. 162/89, 90, 29, 30, 162/66, 67, 32, 28

[56] References Cited

U.S. PATENT DOCUMENTS

| | | | |
|---|---|---|---|
| 2,169,473 | 8/1939 | Olsen | 162/90 X |
| 2,805,168 | 9/1957 | Bradley, Jr. | 162/90 X |
| 2,882,965 | 4/1959 | Wayman et al. | 162/89 |
| 3,251,730 | 5/1966 | Watanabe | 162/90 X |
| 3,269,095 | 8/1966 | Brannland | 162/30 X |
| 3,296,064 | 1/1967 | Cann | 162/30 X |
| 3,366,534 | 1/1968 | Rapson | 162/30 |
| 3,652,387 | 3/1972 | Wilder | 162/89 X |
| 3,755,068 | 8/1973 | Rapson | 162/30 |

FOREIGN PATENT DOCUMENTS

| | | | |
|---|---|---|---|
| 110,203 | 1940 | Australia | 162/89 |

OTHER PUBLICATIONS

Christie, "Present State of the Bleaching Art in Canada", Pulp & Paper Mag. of Canada, June 6, 1969, pp. 59–63.

*Primary Examiner*—S. Leon Bashore
*Assistant Examiner*—William F. Smith
*Attorney, Agent, or Firm*—Holman & Stern

[57] ABSTRACT

A pulping process which includes the steps of oxidizing vegetable materials with an oxidizing chemical selected from the group comprising $Cl_2$, $Cl_2O$,$ClO_2$, $Mg(ClO)_2$, $Mg(ClO_2)_2Mg.(ClO_3)_2$ and mixtures thereof, extracting the oxidized materials with $Mg(OH)_2$ thereby to delignify and bleach the materials and treating the waste liquor from the oxidation, extraction and washing steps by combustion or thermal decomposition thereby to regenerate the chemicals necessary for the oxidation and extraction steps. The process of the invention produces semi-bleached or completely bleached pulp of high strength with high yield while eliminating the problem relating to environmental pollution.

5 Claims, 5 Drawing Figures

PROCESS OF THE PULPING OF BLEACHING OF VEGETABLE MATERIAL

BACKGROUND OF THE INVENTION

This invention relates to a process for producing pulp from vegetable materials including a step for treating waste liquor generated in the pulp production to recover the chemicals therefrom for reuse.

There are a variety of chemical processes for producing pulp on mill scale and the two prominent processes among the prior art chemical processes for producing pulp are the so-called sulfite process and the so-called sulfate or kraft process. However, these prior art processes have inherent disadvantages such as (1) in the pulping stage of the prior art processes, a substantial portion of the hemicellulose and cellulose in the materials are lost and the fibers of the materials themselves are chemically and/or mechanically damaged resulting in lowering of the yield of pulp and also in reduction of the strength of paper prepared from such pulp; (2) as to the sulfite process, no pertinent technology for treating waste liquor generated in the pulping step has been established; (3) as to the kraft process, although a pertinent technology for treating waste liquor has been established, the process emits a particularly offensive smell; (4) both the prior art processes make it difficult to economically treat waste liquor generated in the bleaching step; and (5) both the prior art processes require the performing of the pulping and bleaching steps separately resulting in complication of equipment and operation procedure.

In view of the above-mentioned disadvantages of the prior art pulp production processes, efforts have been made to develop a chemical pulping process which can produce pulp with high yield and which can effectively eliminate environmental pollution which may be otherwise caused by waste liquor and exhaust gasses and which have been inevitable in the prior art pulping processes. It has been known in the art that chlorine containing chemicals such as $Cl_2$, $Cl_2O$, $ClO_2$, NaClO and $NaClO_3$ can be used in the selective delignification of vegetable materials. The delignification of vegetable materials with the above-mentioned chlorine containing chemicals in combination with the extraction treatment with an organic solvent such as monoethanol amine or NaOH has been described in Japanese Pat. No. 573,946 issued to Ayukawa (published Nov. 26, 1969) and in the report by Norman S. Tompson et al, appearing in "TAPPI" Vol. 47, No. 3, pages 157–162 (March 1964), for example. Although these delignification processes have advantages in that they produce pulp which is relatively free of chemical and/or mechanical damage with a relatively high yield, since no economical and effective recovery technology for treating waste liquor generated in the pulping step has been established, such pulping processes have not yet been practiced on a mill scale.

SUMMARY OF THE INVENTION

A principal object of the present invention is to provide a process for producing pulp which incorporates improved pulping and bleaching steps therein.

According to the present invention, chips of vegetable materials are first pretreated by chemical, mechanical and/or thermal means and then subjected to plural treatment stages including at least one basic treatment stage which comprises combination of one oxidation treatment step with a member selected from the group which includes $Cl_2$, $Cl_2O$, $ClO_2$, $Mg(ClO)_2$, $Mg(ClO_2)_2$, $Mg(ClO_3)_2$and mixtures thereof and one extraction treatment step with $Mg(OH)_2$. The basic treatment stages can selectively delignify vegetable material and almost all of the cellulose and hemicellulose of the chips can be extracted from the materials without being subjected to mechanical and/or chemical damage. Consequently, the pulp yield is high and the obtained pulp has high strength. The high pulp yield and the high strength of pulp are due to the selective use of a member selected from the group comprising $Cl_2$, $Cl_2O$, $ClO_2$, $Mg(ClO)_2$, $Mg(ClO_2)_2$, $Mg(ClO_3)_2$ and mixtures thereof as the oxidizing agent as well as the use of $Mg(OH)_2$ as the extracting agent. The use of the above-specified oxidizing agents and extraction agent assures a quite practical waste liquor treatment. In other words, the waste liquor from the combined oxidation and extraction step is collected and burned or thermally decomposed. As a result of the combustion or thermal decomposition of the waste liquor, MgO and Cl are separated from the liquor and collected in the form of MgO and HCl gas, respectively and the collected MgO and HCl gas are converted into the oxidation and extraction agents for reuse.

In this way, the present invention can provide a pulping process with a very effective chemical recovery system, and it can produce a pulp of high quality at a very high yield without any environmental pollution problems.

Therefore, a principal object of the present invention is to provide a process for producing a semi-bleached or completely bleached pulp with a high yield.

Another object of the present invention is to provide a process for producing high quality pulp with economical equipment, less chemical expense and a simplified procedure.

Another object of the present invention is to provide a process for producing high quality pulp which eliminates problems relating to environmental pollution.

A further object of the present invention is to provide a process for bleaching unbleached pulp which includes a waste liquor treatment step.

According to the present invention, there has been provided a process for the pulping and bleaching of vegetable materials which comprises in combination the steps of treating finely shredded vegetable material with an oxidizing chemical selected from the group comprising $Cl_2$, $Cl_2O$, $ClO_2$, $Mg(ClO)_2$, $Mg(ClO_2)_2$, $Mg(ClO_3)_2$ and mixtures thereof; extracting said material with $Mg(OH)_2$, said oxidation and extraction steps being performed in a plurality of stages, respectively; collecting and evaporating waste liquor discharged from said pulping and washing steps; burning or thermally decomposing said waste liquor to generate a mixture of MgO and HCl; and regenerating said $Mg(OH)_2$ and oxidizing chemicals from said MgO and HCl.

The above and other objects and attendant advantages of the present invention will be more readily apparent to those skilled in the art from the following detailed description in conjunction with the accompanying drawings which show preferred embodiments of the invention for illustration purposes only, but not for limiting the scope of the invention in any way.

DETAILED DESCRIPTION

Figure 1:
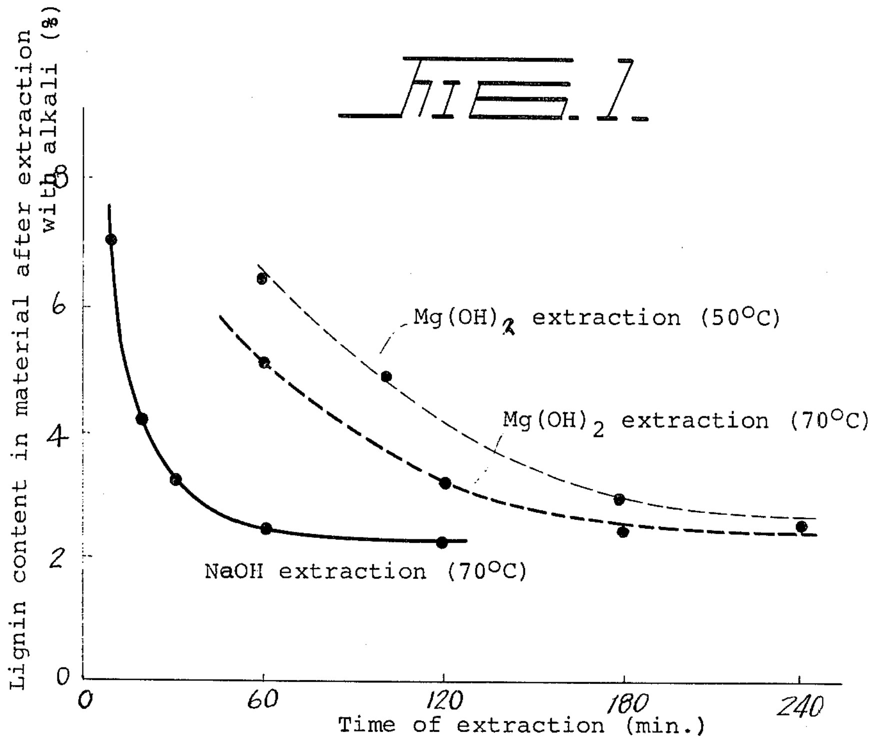
FIG. 1 is a graph which compares the extraction effects between NaCH and $Mg(OH)_2$ employed as extraction agents for the extraction treatment step in the process of the invention.

The above objects of the invention can be attained by carrying out the oxidation and extraction steps with the use of the above specified treatment agents. We have found that even when the base of $NaClO$, $NaClO_2$ and $NaClO_3$ which have been theretofore employed as oxidizing agents in the same manner as $Cl_2$, $Cl_2O$ and $ClO_2$ is replaced by Mg such as $Mg(ClO)_2$, $Mg(ClO_2)_2$ or $Mg(ClO_3)_2$, the oxidizing or bleaching ability of the agents is not lost. Moreover, anhydrous $MgCl_2$ is also decomposed in the presence of oxygen in the dry state. A process for regenerating delignifying chemicals utilizing such a reaction is described hereinbelow as a modification of the treatment of waste liquor by the present invention. We have also found that $Mg(OH)_2$ which is water-insoluble can be effectively employed as an extraction agent in the same manner as NaOH which has been conventionally employed as a water-soluble extraction agent. A series of experiments were conducted on the extraction effects of $Mg(OH)_2$ and the results of the experiments are shown in FIG. 1. As the preparatory step, finely shredded chips of Japanese beech employed as the vegetable material were placed in water maintained at 25° C in an amount sufficient to provide 3% by weight concentration of chips, 25% by weight of $Cl_2$ gas based on the vegetable material was added to treat the material for 3 hours and the thus treated vegetable material was then fully rinsed with water to obtain a chlorinated material having a lignin content of 19.3% by weight. The chlorinated material was converted into a slurry having a 10% concentration of the material and the slurry was divided into several portions. The slurry portions were subjected to an extraction treatment with NaOH and $Mg(OH)_2$, respectively for different periods of time. The NaOH was employed in the amount of 10% based on the dry weight of the material whereas the amount of $Mg(OH)_2$ was 7.3% based on the dry weight of the material. The relationship to the lignin contents of pulps obtained in the series of experiments (measured in accordance with TAPPI Standard T-220m) are shown in FIG. 1. From FIG. 1, it will be seen that the extraction rate with $Mg(OH)_2$ is relatively slow as compared with that with NaOH. This may be due to the fact that as the minor amount of dissolved $Mg(OH)_2$ in the liquid phase is consumed through the neutralization of acidic substances, the $Mg(OH)_2$ which is present in the solid phase gradually transits to the liquid phase and requires a relatively long time period to progressively react. However, the relatively long time period required for the extraction step by the use of $Mg(OH)_2$ as the extraction agent will not essentially lessen the utility of such a chemical as the extraction agent. Such disadvantage of $Mg(OH)_2$ as the extraction agent can be fully compensated for by selecting a suitable concentration of $Mg(OH)_2$, a suitable extraction temperature or a suitable pre-treatment step of material chips. Pre-treatment of vegetable materials is a preferable means for accelerating the delignification action of the above-mentioned delignification agents and the relatively slow extraction action of $Mg(OH)_2$. According to the present invention, such pre-treatment comprises a mechanical treatment such as refining, a thermal treatment with hot water or vapor, and a chemical treatment with ammonium hydroxide or magnesium hydroxide or the combination thereof. Such pre-treatment accelerates the action of the oxidation and extraction agents on vegetable materials and reduces the time period required for such treatments.

Thus, according to the present invention, finely shredded vegetable materials and preferably, such materials which have experienced the above-mentioned pre-treatment step are subjected to a plurality of treatment stages including a basic treatment stage which comprises in combination an oxidation treatment with a member selected from the group comprising $Cl_2$, $Cl_2O$, $ClO_2$, $Mg(ClO)_2$, $Mg(ClO_2)_2$, $Mg(ClO_3)_2$ and mixtures thereof and an extraction treatment with $Mg(OH)_2$. The oxidation treatment can be effectively performed in a conventional treatment tower and the material may be heated as desired or as necessary. The heating of the material reduces the necessary contact time period between the delignification agent and vegetable material, but the contact time period is usually optionally selected depending upon the concentration of the agent and/or pulp yield intended. After the oxidation treatment, the vegetable material is water rinsed in a conventional vacuum drum washer or the like device, the rinsing being followed by the extraction treatment. The extraction treatment is carried out in a conventional extraction tower. The amount of $Mg(OH)_2$ to be added to the material is usually within the range of 2–15% by weight based on the absolute dry weight of the vegetable material employed. The extraction treatment with $Mg(OH)_2$ is usually carried out at temperatures from about 50° to 90° C for 60 minutes and after the reaction treatment, the vegetable material is again water-rinsed in the same manner as that followed after the oxidation treatment. The oxidation and extraction treatments may be repeatedly performed until bleached pulp of about 80–90 G.E. brightness (TAPPI standard T217m-48) is obtained with yield between 55–77%. When the above-specified treatment conditions are slightly alleviated, semi-bleached pulp can be obtained with higher yield. According to the present invention, in the above-mentioned oxidation treatment, a portion of the particular chlorine containing agents may be substituted for oxygen, hydrogen peroxide or peracetic acid. Similarly, in the extraction treatment, a portion of $Mg(OH)_2$ can be substituted for ammonium hydroxide or ammonia gas. Such substitution of the oxidation and extraction agents will not require any change in the waste liquor treatment system which will be described hereinafter.

The bleached pulp obtained by the above-mentioned oxidation and extraction treatments has excellent properties such as high hemicellulose content, high carboxyl content and low carbonyl content. Higher hemicellulose content in pulp contributes to higher yield than that obtained in the conventional bleached kraft pulp. And it is well known in the art that the higher the carbonyl content in pulp, the lower the brightness stability of the pulp. Since bleached pulp obtained by the present invention has a quite low carbonyl content, the pulp has a quite high brightness stability. Such chemical properties of the pulp have favorable effects on the physical properties of the pulp. As a result, paper products obtained from the pulp of the present invention exhibit excellent tear and tensile strength.

As will be made apparent hereinafter, the above-mentioned delignification treatment makes it possible to treat the waste liquor from the delignification treatment step quite practically. As a result, the recovery step of the delignification and extraction agents is incorporated in each of the plural oxidation and extraction treatment stages thereby to provide a pulping process which utilizes such agents economically and is free of problems relating to environmental pollution.

Figure 2:
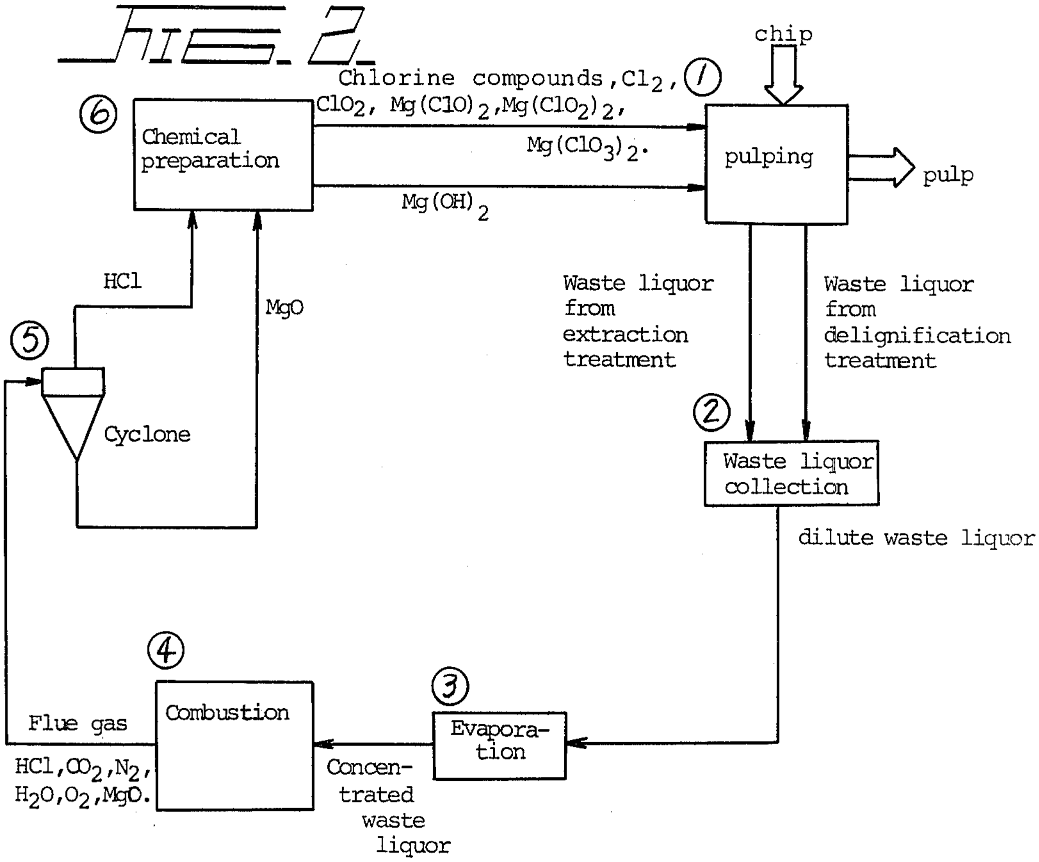
FIG. 2 is a flow sheet which shows the system of a basic treatment stage which comprises in combination a pulping step and a chemical recovery step in the process of the invention.

As mentioned hereinabove, the waste liquor from each of the plural oxidation and extraction treatment stages using the specific oxidation agent and $Mg(OH)_2$ or the extraction agent is treated in the system as shown in FIG. 2 for recovering useful chemicals contained in the waste liquor for reuse. More particularly, referring to FIG. 2, dilute waste liquor from each of the plurality of combined oxidation and extraction treatment or pulping stages (1) is collected in a waste liquor collection step (2) and enters an evaporation step (3) where the waste liquor is concentrated to a concentration sufficient to be easily treated in a combustion step (4) subsequent to the evaporation step (3). When the dilute waste liquor at the time of the evaporation step (3) has Cl to Mg ion equivalent ratios greater than 2:1, Cl will be easily lost through the vaporization thereof. In such a case, $Mg(OH)_2$ is added to the dilute waste liquor to adjust the Cl to Mg ratio and then the dilute waste liquor is passed to the evaporation step (3). After the evaporation step (3), the waste liquor is passed to combustion step (4) where the waste liquor is burned. In the combustion step (4), Mg and Cl in the waste liquor are converted into MgO powder and HCl gas, respectively and the powder and gas pass through a flue along with flue gases. The flue gases are then passed to a cyclone or similar separator (5) where the gases are separated into gas containing HCl and MgO powder. Both the HCl containing gas and MgO powder are passed to the chemicals regeneration step (6) where they are converted into the oxidation agent and $Mg(OH)_2$ to be passed to the combined oxidation and extraction treatment or pulping step (1).

Now, description will be had on most prominent features of the above-mentioned waste liquor treatment system. First of all, as mentioned above, the Mg - Cl containing waste liquor is separated into MgO powder and HCl gas. Whereby the subsequent chemicals regeneration step can be substantially simplified. In addition to Mg - Cl containing waste liquor, we have also studied the behaviour of Na - Cl, K - Cl and Ca - Cl containing waste liquors to find out that Na -Cl, K - Cl and Ca - Cl containing waste liquors generate NaCl, KCl and $CaCl_2$, respectively through the combustion thereof and none of them can separate chlorine from alkali. Thus, the regeneration of chemicals necessary for the pulping step from these waste liquors requires the so-called electrolysis or other quite complicated steps. However, it has now been found that Mg -Cl containing waste liquor can be quite easily separated into MgO and HCl with the thermal energy obtained through the combustion of the waste liquor.

The characteristic behaviour of the Mg - Cl waste liquor as mentioned hereinabove will be now theoretically described hereinbelow. The following Table 1 shows the behaviour of NaCl, KCl, $CaCl_2$ and $MgCl_2$ when heated and from the Table, it will be seen that these anhydrides are quite stable salts, that they will not decompose with heat and that they vaporize at temperatures of 1,400°-1,600° C.

Table 1

| | Molecular weight | Melting point | Boiling point |
|---|---|---|---|
| NaCl | 58.44 | 800.4° C | 1413° C |
| KCl | 74.56 | 776 | 1500 |
| $CaCl_2$-$6H_2O$ | 219.08 | 29.92 | -$4H_2O$ 30 |
| $CaCl_2$-$2H_2O$ | 147.02 | — | -$H_2O$ 175 |
| $CaCl_2$-$H_2O$ | 129.00 | 260 | -$H_2O$ 300 |
| $CaCl_2$ | 110.99 | 772 | >1600 |
| $MgCl_2$-$6H_2O$ | 203.31 | — | decomposition 118 |
| $MgCl_2$ | 95.22 | 712 | 1412 |

Pages 57–62 of "Chemical Manual" edited by the Japan Chemical Society, and published by Maruzen Co., Ltd. September 25, 1966.)

Thus, although it is difficult to decompose these anhydrous salts (except for $MgCl_2$) into chlorine and alkali with thermal energy in such a manner as is suitable for the regeneration of pulping agents, it is to be noted that $MgCl_2$ can be thermally decomposed in the presence of hydrate water. The behavious of $MgCl_2$containing hydrate water at different temperatures will be in detail shown below:

| | | | |
|---|---|---|---|
| $MgCl_2$-$8H_2O$ | → | $MgCl_2$-$6H_2O$ | −34° C |
| $MgCl_2$-$6H_2O$ | → | $MgCl_2$-$4H_2O$ | 118° C |
| $MgCl_2$-$4H_2O$ | → | $MgCl_2$-$2H_2O$ | 182° C |
| $MgCl_2$-$2H_2O$ | → | $MgCl_2$-$H_2O$ | 240° C |
| $MgCl_2$-$H_2O$ | → | MgO + 2HCl | 700 – 800° C, |

(page 282, Vol. 1, "Producton process Collection" edited by the process Flow Sheet Research Society, Chemical Industry Bureau, MITI, and published by Chemical Industry Company, September 10, 1968.)

As seen from the above, MgCl is separated into MgO and HCl at high temperatures only in the presence of water. The combustion of Mg - Cl containing waste liquor is favorable suited for the decomposition conditions. Even heated in the presence of hydrate water, $CaCl_2$ will merely lose its hydrate water and cannot be decomposed into CaO and HCl.

In this way, it is relatively easy to regenerate chemicals necessary for the oxidation and extraction treatments from MgO and HCl which were generated through the combustion of Mg - Cl containing waste liquor and many procedures for the regeneration of such necessary chemicals may be contemplated. Although the present invention is not limited thereto, a few examples of such procedures will be described hereinbelow.

Figure 3:
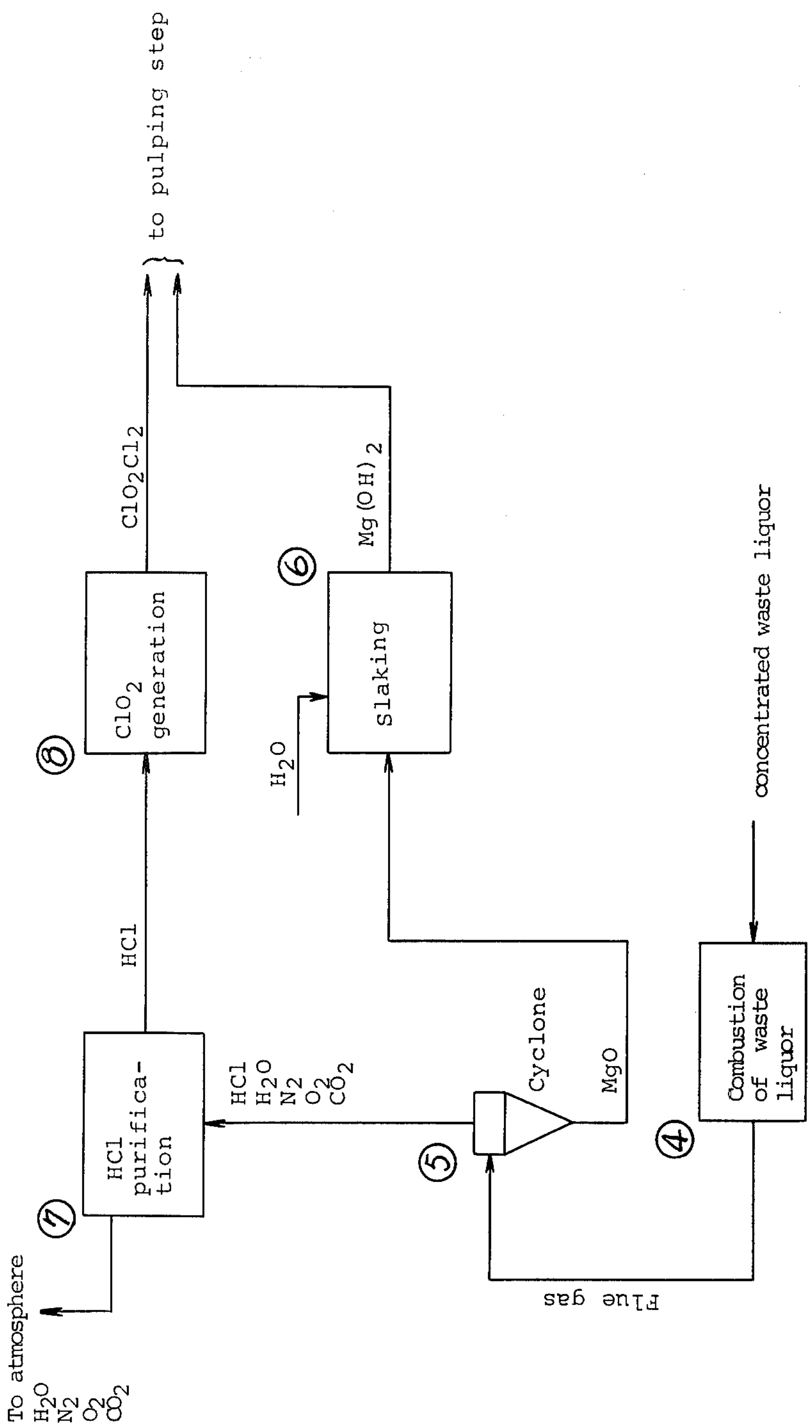
FIGS. 3, 4 and 5 are flow sheets which show modified systems for the chemical recovery step in the process of the invention.

Referring to FIG. 3, one example of the system for the regeneration of such necessary chemicals is shown. Flue gas generated through the combustion of waste liquor is separated into MgO and gas-containing HCl in a cyclone or similar separator 5. The MgO is passed to a slaking step (6) where the MgO is heated together with water to provide $Mg(OH)_2$, which is to be employed in the extraction treatment step. On the other hand, the gas containing HCl is passed to a HCl purification step (7) to be purified to high purity HCl gas or solution. In addition to the HCl purification procedure mentioned above, there are other procedures which may be employed. Thus, flue gas is cooled to condense its HCl and $H_2O$ and thereafter, the HCl and $H_2O$ are repeatedly heated and condensed until a desired concentrated hydrochloric acid or alternatively, flue gas is scrubbed with $Mg(OH)_2$ slurry obtained from the slaking step and HCl is collected in the form of $MgCl_2$. Thereafter, the obtained $MgCl_2$ is thermally decomposed in the presence of hydrate water to be separated into HCl gas and MgO. The thus purified HCl is then passed to a $ClO_2$ generation step (8) where the HCl reacts with chlorate to generate a substantial proportion of $ClO_2$ and a minor portion of $Cl_2$ the latter being a side product. These $ClO_2$ and $Cl_2$ materials are passed to the pulping step to be used as the delignification and bleaching agents there. As to the side product $Cl_2$, this product is reacted with a portion of $Mg(OH)_2$ obtained from the slaking step (6) and may be passed to the pulping step as Mg-hypochlorite. And as to the $ClO_2$ generator to be employed in the $ClO_2$ generation step (8), the conventional device useful in the so-called Kesting process (including the chlorate production step with the use of salt) is advantageously employed because HCl is employed in the $ClO_2$ generation step.

Figure 4:
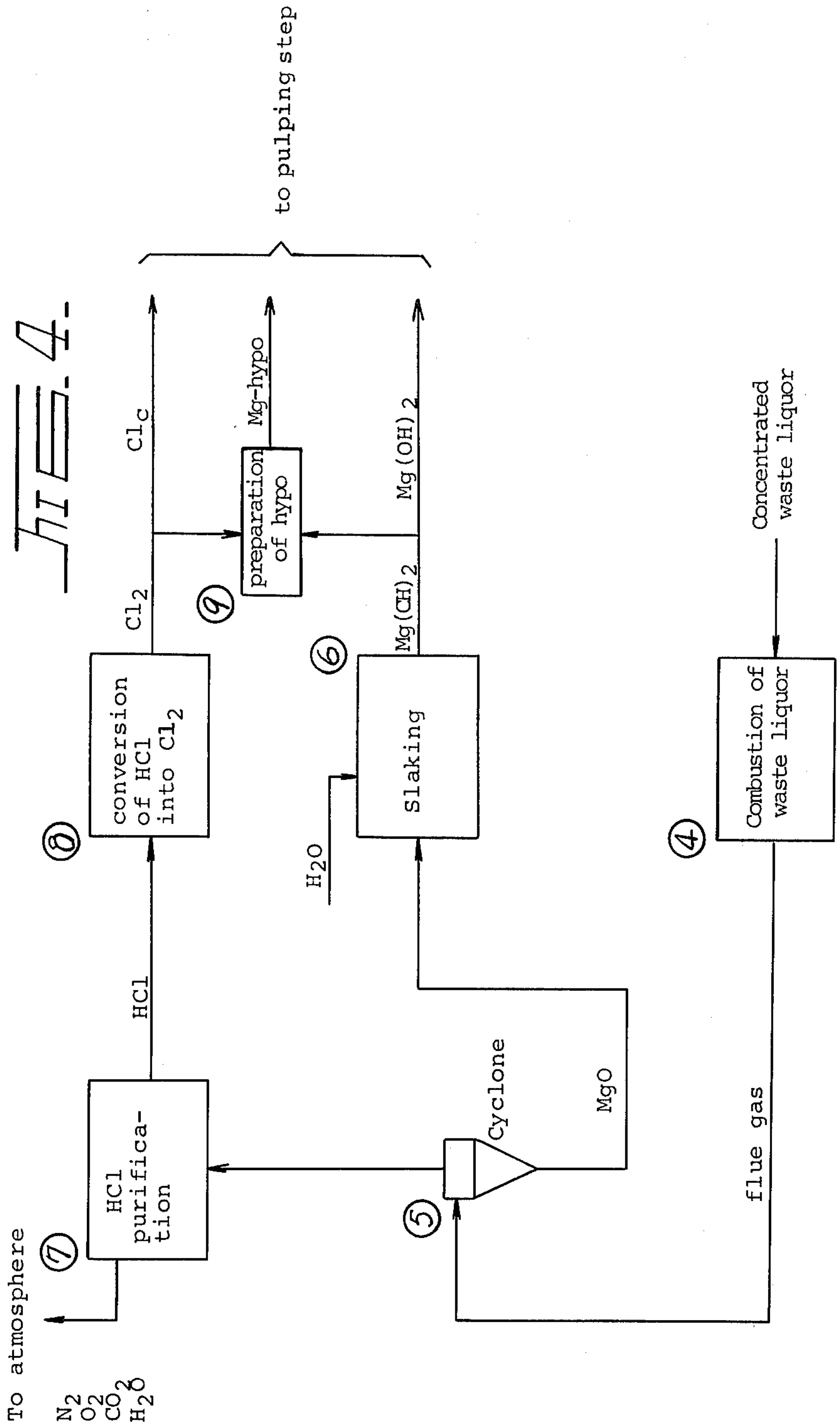

Referring now to FIG. 4, a second form of waste liquor treatment system for regenerating $Mg(OH)_2$, $Cl_2$ and Mg-hypochlorite from MgO and HCl, the combustion products of waste liquor, is shown. MgO separated from HCl in a cyclone (5) is passed to a slaking step (6) in which the MgO is heated together with water to be converted into $Mg(OH)_2$. On the other hand, the gas-containing HCl from the cyclone (5) is passed to a HCl purification step (7) where the gas is purified to a higher purity HCl. In the treatment system of FIG. 4, the HCl purification is performed in the same manner as described in connection with the treatment system of FIG. 3. The higher purity HCl is then passed to a conversion step (8) where the HCl is converted into $Cl_2$. The conversion of HCl into $Cl_2$ may be performed in any of the conventional procedures. As the conventional procedures suitable for the purpose, there are known the so-called Hoechst-Uhde process in which a HCl solution is electrolyzed to provide $H_2$ and $Cl_2$, the Deacon process and Shell process in which HCl is oxidized with oxygen or air, for example.

A portion of the thus obtained $Cl_2$ is passed to the oxidation step as it is and the remaining portion of the $Cl_2$ is reacted with portion of $Mg(OH)_2$ obtained in the slaking step (6) to provide Mg-hypochlorite which is then passed to the oxidation step.

Figure 5:
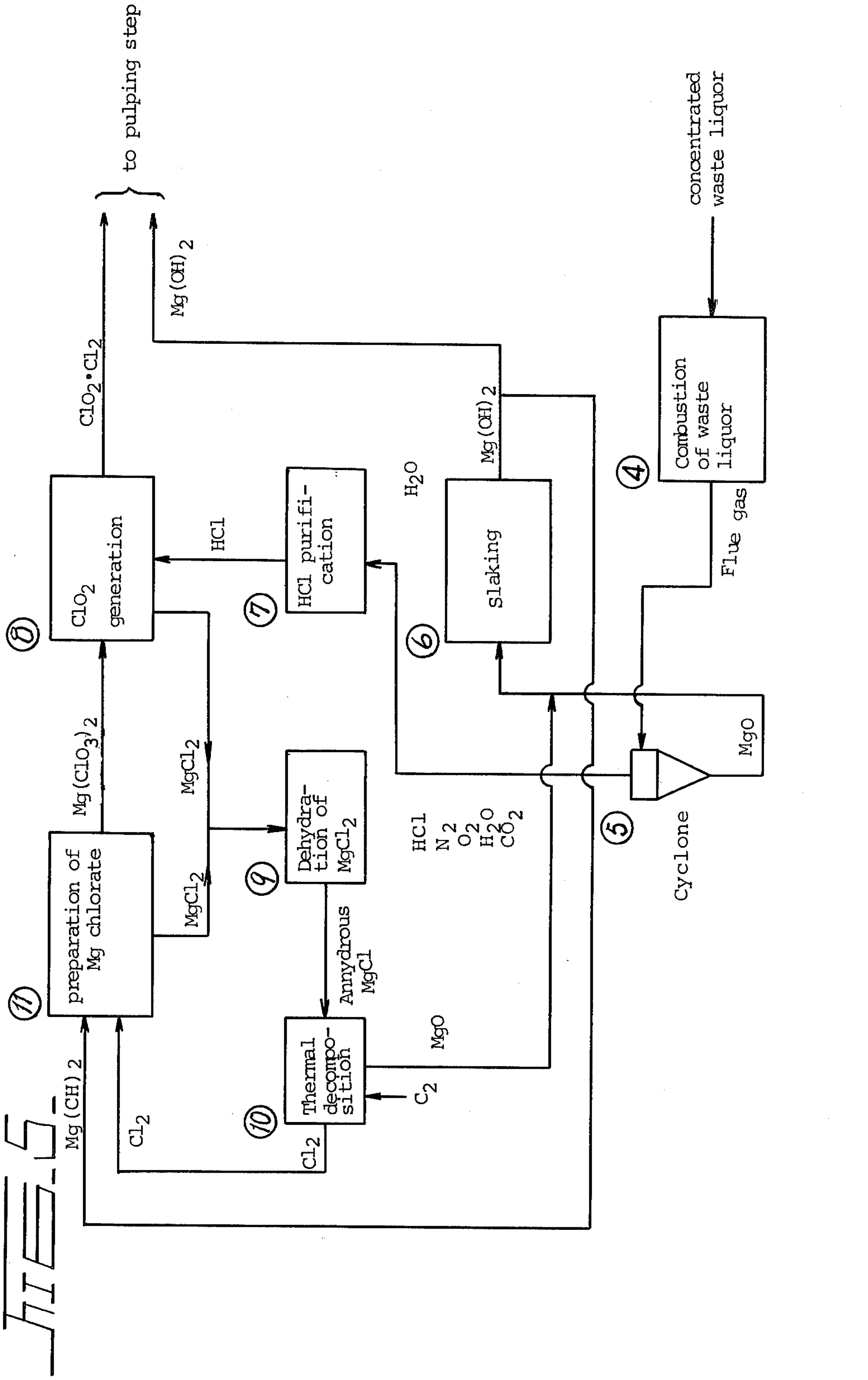

FIG. 5 shows a third form of waste liquor treatment system for regenerating the chemicals for the pulping step. In this system, MgO separated from HCl in a cyclone (5) is passed to a slaking step (6) where the MgO is converted into $Mg(OH)_2$ which is then passed to the pulping step (1) in the same manner as mentioned in connection with the systems of FIGS. 3 and 4. On the other hand, the HCl separated from the MgO in the cyclone (5) is passed to a HCl purification step (7) where the HCl is purified to a higher purity HCl gas or solution in the same manner as mentioned in connection with the systems of FIGS. 3 and 4 and the HCl gas or solution is then passed to a $ClO_2$ generation step (8) where the HCl is reacted with $Mg(ClO_3)_2$ (Mg-chlorate) which is prepared in a manner as will be described hereinafter to provide $ClO_2$ and $Cl_2$ in accordance with the following reaction formula:

$$Mg(ClO_3)_2 + 4HCl \rightarrow 2ClO_2 + Cl_2 + MgCl_2 + 2H_2O$$

The thus formed $ClO_2$ and $Cl_2$ are passed to the pulping step (1). Alternatively, the side product $Cl_2$ may be reacted with $Mg(OH)_2$ and passed to the pulping step (1) in the form of $Mg(ClO)_2$ (Mg-hypo). The $MgCl_2$ generated through the above reaction in the $ClO_2$ generation step is not discarded, but utilized for the preparation of $Mg(ClO_2)_2$. More particularly, the $MgCl_2$ which was separated from the waste liquor by concentration thereof in the $ClO_2$ generation step (8) is passed to a dehydration step (9) where the $MgCl_2$ is deprived of hydrate water. Although the dehydration of $MgCl_2$ may be carried out by various procedures, one effective procedure for the purpose is to utilize $NH_4Cl$. According to this procedure, $NH_4Cl$ vapor is passed through $MgCl_2 \times H_2O$ maintained at a temperature slightly over 200° C to provide an anhydride ammonium carnalite ($MgCl_2 \cdot NH_4Cl$) thereby to remove hydrate water by vaporization thereof in accordance with the following reaction formula:

$$MgCl_2 \times H_2O + NH_4Cl \rightarrow MgCl_2 \cdot NH_4Cl + xH_2O \uparrow \qquad (1)$$

The thus obtained anhydrous complex salt is thermally decomposed at an elevated temperature in accordance with the following reaction formula to vaporize $NH_4Cl$ ($NH_4Cl$ is sublimated at 339° C) thereby to provide $MgCl_2$.

$$MgCl_2 \cdot NH_4Cl \rightarrow MgCl_2 + NH_4Cl \uparrow \qquad (2)$$

The thus generated $NH_4Cl$ vapor will not be discarded, but recycled for the above-mentioned reaction (1). In addition to the above-mentioned dehydration of hydrated $MgCl_2$, the hydrated $MgCl_2$ may be dehydrated by means of heated air or heated dry HCl gas. Whatever means may be employed for dehydrating hydrated $MgCl_2$, the thus obtained dehydrated $MgCl_2$ is then passed to a thermal decomposition step (10) where the $MgCl_2$ is heated in the presence of air or oxygen and reacted in accordance with the following reaction formula to be decomposed into $Cl_2$ gas and MgO.

$$2MgCl_2 + O_2 \rightarrow 2MgO + 2Cl_2$$

The thus obtained MgO is passed to the slaking step (6) where the MgO is converted into $Mg(OH)_2$ and on the other hand, the $Cl_2$ gas is passed to a chlorate preparing step (11) together with portion of the $Mg(OH)_2$ from the slaking step (6) where the $Cl_2$ gas and portion of the $Mg(OH)_2$ are reacted with each other in accordance with the following reaction formula to provide Mg chlorate.

$$6Mg(OH)_2 + 6Cl_2 \rightarrow Mg(ClO_3)_2 + 5MgCl_2 + 6H_2O$$

The thus obtained $Mg(ClO_3)_2$ is separated from $MgCl_2$ by concentrating the reaction product and then passed to the $ClO_2$ generation step (8) to be reacted with HCl as mentioned hereinabove to provide $ClO_2$. On the other hand, the separated $MgCl_2$ is recycled to the dehydration step (9) together with $MgCl_2$ from the $ClO_2$ generation step (8) for re-use.

Although three types of systems for regenerating chemicals necessary for pulping of vegetable materials with the use of MgO and HCl have been described referring to FIGS. 3, 4, and 5, since the present invention is based on the principle that vegetable materials are pulped with the above-specified oxidation and extraction agents and the waste liquor generated in the pulping step is concentrated and burned to be separated into MgO powder and HCl gas whereby the subsequent pulping agent preparation can be easily performed by various procedures, the chemical regeneration of the invention is not limited to only the above-mentioned three procedures. For example, pulping agents may be prepared by any combination of the above-mentioned three types of procedures or any combination of one of the three procedures and any other conventional procedure without departing from the scope of the invention.

It may be appreciated that the loss of some of the pulping chemicals is inevitable in the course of the pulping and chemical recovery steps and therefore, it is necessary to replenish Mg and Cl by any means. For the purpose, either MgO or $Mg(OH)_2$ may be employed as the Mg replenishing agent and similarly, either HCl or $Cl_2$ may be employed as the Cl replenishing agent. In addition, $MgCl_2$ can be concurrently employed as the replenishing material for both Mg and Cl. However, it is to be noted that the present invention is not limited to the use of the above-mentioned Mg and/or Cl replenishing agents, but leas expensive Mg and/or Cl supply sources easily available at the location of the pulp production mill may be employed and such replenishing agents may be added to suitable points in the pulping and chemical recovery steps. Thus, the present invention is also versatile with respect to this point.

When part of the oxidation treatment step is carried out with the use of oxygen or hydrogen peroxide or peracetic acid or when part of the extraction step is carried out with the use of ammonium hydroxide or ammonium gas, since such materials contained in the waste liquor are easily gasified through the combustion thereof and released out of the system, the chlorine-containing agent and $Mg(OH)_2$ necessary for pulping can be easily regenerated without modifying the above-mentioned procedures for the chemical recovery steps in any way.

In the foregoing, although the pulping process of the invention has been described as a process in which the oxidation, extraction and waste liquor treatment steps are successively performed, it will be easily appreciated by those skilled in the art that such process can be applied to the bleaching of pulp. According to the present invention, unbleached pulps obtained by the conventional sulfite and kraft processes can be processed to completely bleached pulps having high brightness through the oxidation-extraction treatment as described hereinabove and the waste liquor generated during the treatment can be effectively treated to regenerate necessary chemicals through the waste liquor treatment steps as mentioned hereinabove. Although there is still the difficulty left that the pulping step and bleaching step are separately performed nevertheless, the process of the invention will improve the bleaching step.

The present invention will be now described by way of specific examples in which the present invention was successfully carried out, but it will be understood that the invention is not limited to such examples because they merely illustrate the invention.

EXAMPLE 1

1 kg. (oven dry weight) chips of Japanese beech was immersed in warm water maintained at 80° C for 30 minutes to soften the chips, coarsely ground in a disk refiner having a plate clearance maintained at 55/1000 inch and then is watered to provide a coarsely ground material. The material was subjected to the pulping step in five stages under the treatment conditions as shown in the following Table 2 to obtain a high quality bleached pulp having a brightness of 87% GE with a yield of 65.8%.

Table 2

| | First Stage $ClO_2$ | Second Stage $Mg(OH)_2$ | Third Stage $ClO_2$ | Fourth Stage Mg(OH) | Fifth Stage $ClO_2$ |
|---|---|---|---|---|---|
| Charge of chemicals (% based on the weight of material) | 10 | 8 | 3 | 4 | 1 |
| Consistency of material (%) | 7 | 10 | 10 | 10 | 10 |
| Treatment temperature (°C) | 70 | 60 | 80 | 60 | 80 |
| Treatment time period (hours) | 3 | 4 | 4 | 3 | 4 |

After completion of the pulping step, the waste washing liquor in each stage was collected and then concentrated in a rotary evaporator to about 60% solid concentration. The thus concentrated waste liquor was then burned in an electric oven maintained at 1,200° C to obtain 82.2 g. of ash. The ash was analyzed and it was found that the ash comprised about 96% of MgO, the rest consisting of a substantial proportion of $CaCl_2$ and a trace of iron. In this case, the yield of recovered MgO was about 94% against the amount of $Mg(OH_2)_2$ employed in the pulping step. The thus obtained ash was dissolved in water and filtered to separate soluble $CaCl_2$. The undissolved MgO was boiled together with water for about 2 hours until it was converted into $Mg(OH)_2$. On the other hand, the combustion gas generated during the combustion of the waste liquor was passed through a water reflux-type condenser to recover HCl and $H_2O$ through the condensation thereof. After an analyzation of the condensate, it was found that the condensate contained 65 g. of HCl. This means that about 85% of Cl added to the system in the form of $ClO_2$ during the pulping step was recovered. The HCl solution was repeatedly subjected to stripping and condensation to obtain 30% HCl solution and the solution was reacted with chlorate to provide $ClO_2$.

EXAMPLE 2

1 kg. (oven dry weight) of chips of spruce was immersed in 6 l. of 1.4 normal solution of $Mg(ClO_2)_2$ and the normal solution remained at room temperature and atmospheric pressure for 48 hours. Thereafter, an excess amount of the solution was drained from the material and then added thereto was 6 l. of 0.8 normal solution of HCl. The material was left as it was for 24 hours at room temperature and atmospheric pressure being followed by heating at 70° C for 1 hour. Thereafter, the solution was drained from the material and the material was rinsed with water. The chips were then added thereto 10% of $Mg(OH)_2$ by weight of the material and adjusted by adding water to provide a solution of 10% concentration of the material and heated at 70° C for 3 hours. Therreafter, the solution was removed from the chips and the chips were water rinsed. The thus treated chips were easily disintegrated into pulp by means of a disintegrator. The thus obtained pulp was treated with 1% by weight of $ClO_2$ at 10% pulp consistency and 80° C for 4 hours being followed by full water rinse to obtain a bleached pulp having a brightness of 85% GE with a yield of 66.2. The waste liquor generated at the each stage of the pulping step was treated under the same conditions as employed in Example 1 to recover Mg and Cl with a recovery yield of 95% and 88% by weight, respectively.

EXAMPLE 3

Chips of Japanese white birch were immersed in warm water at 90° C for 20 minutes and then coarsely ground in a disc refiner having the disc clearance of 45/1000 inch. The coarsely ground material was passed through a 24 mesh screen and the finer portion which has passed the screen was employed as refiner groundwood pulp whereas the coarser portion which had not passed the screen was employed as the raw material for producing chemical pulp in the present invention. More particularly, 1 kg. of the coarser portion was subjected to pulping in five stages under the conditions as shown in the following Table 3 to obtain a bleached pulp having a brightness of 86.2 GE with a yield of 67.4%.

Table 3

| | First Stage $ClO_2+Cl_2$ | Second Stage $Mg(OH)_2$ | Third Stage $Mg(ClO)_2$ | Fourth Stage $Mg(OH)_2$ | Fifth Stage $ClO_2$ |
|---|---|---|---|---|---|
| Charge of chemicals (% based on weight of material) | 8+5 | 10 | 8* | 5 | 1 |
| Consistency of material (%) | 8 | 10 | 10 | 10 | 10 |
| Treatment temperature (°C) | 60 | 70 | 45 | 70 | 80 |
| Time period of treatment (hrs.) | 3 | 4 | 3 | 3 | 4 |

(*The amount as available chlorine)

The waste washing liquor generated at each stage of pulping step was collected and was mixed together. The mixed waste liquor was then concentrated in an evaporator until 58% of solid concentration was obtained. The concentrated liquor was then burned in an experimental combustion oven to obtain 128 g. of ash. The ash was analyzed and it was found that the ash contained 94% of MgO. This shows that 93% of Mg was recovered in the form of MgO out of the amount of Mg employed in the pulping step. The thus obtained ash comprising a predominent proportion of MgO was dissolved in water and its impurities principally consisting of $CaCl_2$ removed therefrom through filtration. The undissolved MgO was then slaked to be converted into $Mg(OH)_2$. Meantime, the gas generated during the combustion of the concentrated waste liquor was passed through a water reflux-type condenser to recover HCl therefrom. After analysis, it was found that 130 g. of HCl was present in the recovered condensate. This means that about 89% of Cl was recovered in the form of HCl out of the amount of Cl employed in the pulping step. The thus obtained HCl solution was concentrated to 32% HCl concentration solution in accordance with the procedure as described in connection with Example 1 and then added to a chlorate solution to generate $ClO_2$ gas and $Cl_2$ gas. The mixture of $ClO_2$ and $Cl_2$ gases was passed through an absorption tower to provide a $ClO_2$ solution by absorbing $ClO_2$ in cooled water whereas a portion of the unabsorbed $Cl_2$ gas discharged from the absorption tower is reacted with a portion of $Mg(OH)_2$ prepared from the slaking of the recovered MgO to provide $Mg(ClO)_2$. Thus, it was confirmed that $Cl_2$, $ClO_2$, $Mg(ClO)_2$ and $Mg(OH)_2$ all of which are necessary for the pulping step could be recovered. As to chlorate which is employed as the intermediate medium employed in the generation of $ClO_2$ and $Cl_2$, when Na base chlorate or $NaClO_3$ is employed, it can be easily self-supplied through the electrolysis of NaCl contained in the waste liquor of $ClO_2$ generation. And when Mg base chlorate $Mg(ClO_3)_2$ is employed, it can be easily prepared in the steps of dehydration, thermal decomposition and Mg chlorate preparation shown in FIG. 5.

EXAMPLE 4

1 kg. (oven dry weight) of chips of Japanese beech was heated with steam to 170° C and maintained at the temperature for 3 minutes and then coarsely ground in a pressure-type refiner while the chips were maintained at the temperature. The coarsely ground material was subjected to pulping under the conditions as shown in the following Table 4 to obtain a high quality bleached pulp having the brightness of 88% GE with the yield of 60.3%.

Table 4

| | First Stage $ClO_2$ | Second Stage $Mg(OH)_2$ | Third Stage $ClO_2$ | Fourth Stage $NH_3$ | Fifth Stage $H_2O_2$ |
|---|---|---|---|---|---|
| Charge of chemicals (%) | 10 | 8 | 3 | 2 | 1 |
| Consistency of material (%) | 7 | 10 | 10 | 25 | 10 |
| Treatment temperature (°C) | 70 | 60 | 80 | 90 | 80 |
| Time of treatment (hrs.) | 3 | 4 | 3 | 0.5 | 4 |

The waste washing liquor generated from the each stage of pulping treatment was collected and all the waste liquor was mixed together. The mixed waste liquor was concentrated in an experimental evaporator to the concentration of 60% solid and then burned in an experimental oven to obtain 54.1 g. of ash. The ash was analyzed to find out that the ash contained 52.7 g. of MgO. This means that 95.5% of Mg out of the amount of such material employed in the pulping treatment was recovered in the form of MgO. The thus obtained ash was dissolved in water and its impurities (principally consisting of $CaCl_2$) removed through filtration. Thereafter, the undissolved MgO was boiled together with water to be converted into $Mg(OH)_2$. On the other hand, the gas generated during the combustion of the waste liquor was passed through a condenser to recover HCl contained in the gas product. After analysis, it was found that 63.5 g. of HCl was present in the recovered condensate and this means that 90.3% of Cl out of the amount of such material employed in the pulping treatment was recovered in the form of HCl. The HCl in the condensate was further concentrated and then reacted with chlorate to regenerate $ClO_2$ by the same procedure as mentioned in connection with Example 1. In this example, a portion of alkali employed in pulping treatment was substituted for $NH_3$ and a portion of oxidizing chemical was substituted for $H_2O_2$. However, these substitutes are decomposed during the combustion step of the waste liquor and removed from the system as $N_2$ gas and water vapor, such substitution will not adversely affect the MgO and HCl recovery system. Similarly, oxidizing chemicals such as substantially peracetic acid, oxygen, ozone and the like can be employed in place of a portion of the above-specified pulping chemicals because they are also removed out of the system during the waste liquor combustion step in the same manner as $NH_3$ and $H_2O_2$.

EXAMPLE 5

1 kg. (oven dry weight) of unbleached softwood kraft pulp with a Kappa Number of 29.6 was bleached in five stages under the treatment conditions as shown in the following Table 5 to obtain a bleached pulp having a brightness of 89.2%.

Table 5

| | First Stage $Cl_2$ | Second Stage $Mg(OH)_2$ | Third Stage $ClO_2$ | Fourth Stage $Mg(OH)_2$ | Fifth Stage $ClO_2$ |
|---|---|---|---|---|---|
| Charge of chemical (%) | 6 | 2 | 1 | 1 | 0.5 |
| Consistency of pulp (%) | 5 | 10 | 10 | 10 | 10 |
| Treatment temperature (° C) | 20 | 70 | 70 | 70 | 70 |
| Time period of treatment (hrs.) | 1 | 2 | 4 | 2 | 4 |

The waste washing liquor produced in each stage of bleaching treatment was collected and all the waste liquors were mixed together. To the mixed waste liquor was added 30 g. of $Mg(OH)_2$ to adjust the pH of the liquor to a weak alkaline state. The pH adjustment was to prevent the loss of Cl during the subsequent evaporation step. The pH adjusted waste liquor was concentrated in an experimental evaporator to the 60% solid concentration and then burned in an experimental combustion oven to provide 41.6 g. of ash. After analysis, it was found that the ash contained 40.2 g. of MgO and this means that about 97% of Mg out of the amount of such chemical employed in pulping was recovered in the form of MgO. The ash containing MgO was then purified by removing soluble impurities, and water was added thereto followed by heating to convert to $Mg(OH)_2$. On the other hand, the gas generated during the combustion of the waste liquor was passed through a condenser to condense and recover HCl. Analysis of the recovered condensate showed that 63.5 g. of HCl was present in the condensate and this means that about 91% of Cl out of such chemical employed in the bleaching step was recovered in the form of HCl. As mentioned hereinabove, the HCl can be converted in various ways into $Cl_2$ and $ClO_2$ which are necessary for the bleaching.

EXAMPLE 6

Each of the pulps produced in Examples 1–5 was beaten in a PFI mill to C.S. freeness of 400 ml. and the sheets were formed in accordance with TAPPI standard. For comparison purposes, each of commercially available soft-wood and hard-wood bleached kraft pulp and sulfite pulp was similarly beaten and made into sheets. The qualities of thus obtained sheets were measured in accordance with the conventional procedure. The results of these experiments are given in the following Table 6.

Table 6

| | Ex. 1 | Ex. 2 | Ex. 3 | Ex. 4 | Ex. 5 | Market pulp: Bleached kraft | | Market pulp: Bleached sul | |
|---|---|---|---|---|---|---|---|---|---|
| Wood species | Beech | Spruce | White birch | Beech | Soft-wood | Soft-wood | Hard-wood | Soft-wood | Hard-wood |
| Yield (%) | 65.8 | 66.2 | 67.4 | 60.3 | — | — | — | — | — |
| Burst factor | 45.5 | 100 | 65.0 | 54.2 | 91.0 | 89.0 | 50.5 | 83.1 | 31.0 |
| Tear factor | 66.6 | 82.0 | 70.3 | 72.6 | 87.1 | 91.1 | 113 | 91.1 | 66.1 |
| Breaking length (m.) | 7,000 | 13,500 | 10,400 | 7,600 | 12,800 | 12,400 | 7,800 | 11,500 | 5,100 |

From the results of the experiments shown in the above Table 6, it will be seen that in spite of the high yield of pulps of the invention, the quality of paper made of the pulps is superior or equal to that of papers made of the conventional chemical pulps.

Although the best mode contemplated for carrying out the present invention has been herein shown and described, it will be apparent to those skilled in the art that modifications and variations may be made without departing from what is regarded to be the subject matter of the invention.

What is claimed is:

1. A process for the production of pulp which comprises the steps of pulping finely shredded vegetable material by delignifying the same with at least one oxidizing chemical selected from the group consisting of $Cl_2$, $Cl_2O$, $ClO_2$, $Mg(ClO)_2$, $Mg(ClO_2)_2$ and $Mg(ClO_3)_2$; extracting the thus delignified vegetable material with $Mg(OH)_2$; and regenerating $Mg(OH)_2$ and said oxidizing chemical from the waste liquor discharged from the pulping step by burning said waste liquor to generate MgO and HCl and converting the thus obtained MgO and HCl into $Mg(OH)_2$ and said oxidizing chemical.

2. The process as set forth in claim 1, in which said finely shredded vegetable material is prepared by means of at least one of mechanical, chemical and thermal pretreatment or combination thereof.

3. The process as set forth in claim 2 in which said thermal pretreatment comprises refining said finely shredded vegetable material under heating at temperatures over at least 50° C.

4. A process for the production of bleached pulp which comprises the steps of contacting unbleached pulp with at least one oxidizing chemical selected from the group consisting of $Cl_2$, $ClO_2$, $Mg(ClO)_2$, $Mg(ClO_2)_2$ and $Mg(ClO_3)_2$; extracting the thus obtained pulp with $Mg(OH)_2$; and regenerating $Mg(OH)_2$ and said oxidizing chemical from the waste liquor discharged from the bleaching step by burning said waste liquor to generate MgO and HCl and converting the thus obtained MgO and HCl into $Mg(OH)_2$ and said oxidizing chemical.

5. The process as set forth in claim 4, in which said unbleached pulp is water-rinsed unbleached sulfite pulp or water-rinse kraft pulp.

* * * * *